(12) United States Patent
Edwards

(10) Patent No.: US 10,220,506 B1
(45) Date of Patent: Mar. 5, 2019

(54) LASER MEASURING DEVICE FOR A PIPE FITTING

(71) Applicant: Darrlyn Edwards, Rock Hill, SC (US)

(72) Inventor: Darrlyn Edwards, Rock Hill, SC (US)

(*) Notice: Subject to any disclaimer, the term of this patent is extended or adjusted under 35 U.S.C. 154(b) by 0 days.

(21) Appl. No.: 15/271,444

(22) Filed: Sep. 21, 2016

(51) Int. Cl.
   *G01B 5/25* (2006.01)
   *B25H 7/00* (2006.01)
   *G01B 3/56* (2006.01)

(52) U.S. Cl.
   CPC ............ *B25H 7/005* (2013.01); *G01B 3/566* (2013.01)

(58) Field of Classification Search
   CPC ................................ B25H 7/005; G01B 3/563
   USPC .................. 33/274, 412, 482, 483, 484, 485
   See application file for complete search history.

(56) References Cited

U.S. PATENT DOCUMENTS

| | | | | |
|---|---|---|---|---|
| 4,375,724 A * | 3/1983 | Brock | ........................ | G01B 5/24 33/529 |
| 4,380,872 A * | 4/1983 | Moran | ...................... | G01B 3/00 33/427 |
| 4,993,160 A * | 2/1991 | Fraley | ..................... | G01C 15/02 33/286 |
| 5,568,265 A * | 10/1996 | Matthews | ............... | G01B 11/27 33/286 |
| 5,749,153 A * | 5/1998 | Viens | ....................... | B26B 29/06 33/42 |
| 6,230,416 B1 | 5/2001 | Trigilio | | |
| 6,317,993 B1 * | 11/2001 | Loyd | ................... | B23K 37/0536 33/412 |
| 6,449,855 B1 | 9/2002 | Louis | | |
| 7,155,834 B2 | 1/2007 | Palumbo, III et al. | | |
| 7,454,840 B2 * | 11/2008 | Delfini | ...................... | B25H 7/00 33/286 |
| 7,469,480 B2 * | 12/2008 | Nottingham | ......... | G01C 15/002 33/286 |
| 9,126,327 B1 * | 9/2015 | Goodrich, Jr. | ......... | B25H 7/005 |
| 2002/0138995 A1 * | 10/2002 | Dameron | ............. | G01C 15/002 33/286 |
| 2008/0148587 A1 * | 6/2008 | Goodrich | ................ | B25H 7/005 33/529 |
| 2009/0064516 A1 * | 3/2009 | Diaz | ......................... | G01C 9/26 33/451 |
| 2013/0219727 A1 * | 8/2013 | Schmidt | .................. | B43L 7/027 33/481 |
| 2016/0145998 A1 * | 5/2016 | Myeong | ................... | E21B 47/09 33/302 |
| 2017/0341219 A1 * | 11/2017 | Pepper | ..................... | B25H 7/02 |

* cited by examiner

Primary Examiner — G. Bradley Bennett

(57) ABSTRACT

A laser measuring device for a pipe fitting including a framing square having a first arm and a second arm attached to the first arm. Each of a pair of laser housing units is disposed on a top surface of the first arm of the framing square. Each of the pair of laser housing units has a central processing unit, a display screen, an activation control disposed proximal the display screen, and a laser directed outward toward the second arm of the framing square. A lever is slidably disposed on the framing square. The central processing unit of each of the upper laser housing unit and the lower laser housing unit is configured to calculate a distance of the laser of each of the upper laser housing unit and the lower laser housing unit, respectively, from a pipe when the framing square is disposed immediately adjacent to a pipe fitting.

2 Claims, 4 Drawing Sheets

LASER MEASURING DEVICE FOR A PIPE FITTING

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of measuring devices are known in the prior art. However, what has been needed is a laser measuring device for a pipe fitting including a framing square having a first arm and a second arm attached to the first arm. What has been further needed is for each of a pair of laser housing units to be disposed on a top surface of the first arm of the framing square, with each of the pair of laser housing units having a central processing unit, a display screen, an activation control disposed proximal the display screen, and a laser directed outward toward the second arm of the framing square. A lever is slidably disposed on the framing square. Lastly, what has been needed is for the central processing unit of each of the upper laser housing unit and the lower laser housing unit to be configured to calculate a distance of the laser of each of the upper laser housing unit and the lower laser housing unit, respectively, from a pipe when the framing square is disposed immediately adjacent to a pipe fitting. The laser measuring device for a pipe fitting is uniquely structured to allow a user to easily ensure that a pipe fitting is square to a pipe during attachment of the pipe fitting to the pipe.

FIELD OF THE INVENTION

The present invention relates to measuring devices, and more particularly, to a laser measuring device for a pipe fitting.

SUMMARY OF THE INVENTION

The general purpose of the present measuring laser measuring device for a pipe fitting, described subsequently in greater detail, is to provide a laser measuring device for a pipe fitting which has many novel features that result in a laser measuring device for a pipe fitting which is not anticipated, rendered obvious, suggested, or even implied by prior art, either alone or in combination thereof.

To accomplish this, the present laser measuring device for a pipe fitting includes an L-shaped framing square having a first arm and a second arm attached to the first arm. Each of the first arm and the second arm has a top surface and a bottom surface, and the first arm is perpendicularly disposed to the second arm.

The laser measuring device for a pipe fitting further includes a pair of laser housing units, optionally rectangular, including an upper laser housing unit and a lower laser housing unit. Each of the upper laser housing unit and the lower laser housing unit is disposed on the top surface of the first arm of the L-shaped framing square. Each of the upper laser housing unit and the lower laser housing unit has a central processing unit, a display screen, a battery compartment, a battery disposed within the battery compartment, an activation control disposed proximal the display screen, and a laser directed outward toward the second arm of the L-shaped framing square. Each of the central processing unit, the laser, the battery, the display screen, and the activation control of the upper laser housing unit are in operational communication with each other, and each of the central processing unit, the laser, the battery, the display screen, and the activation control of the lower laser housing unit are in operational communication with each other. Additionally, the central processing unit of the upper laser housing unit and the central processing unit of the lower laser housing unit are in operational communication with each other.

A lever is slidably disposed on the second arm of the L-shaped framing square. The activation control of each of the upper laser housing unit and the lower laser housing unit is configured to activate the laser of each of the upper laser housing unit and the lower laser housing unit, respectively. The central processing unit of each of the upper laser housing unit and the lower laser housing unit is configured to calculate a distance of the laser of each of the upper laser housing unit and the lower laser housing unit, respectively, from a pipe when the L-shaped framing square is disposed immediately adjacent to a pipe fitting. The lever is configured to adjust a slope of the pipe fitting between the upper laser housing unit and the lower laser housing unit in order to ensure that the pipe fitting is square to the pipe during attachment of the pipe fitting to the pipe.

Thus has been broadly outlined the more important features of the present laser measuring device for a pipe fitting so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
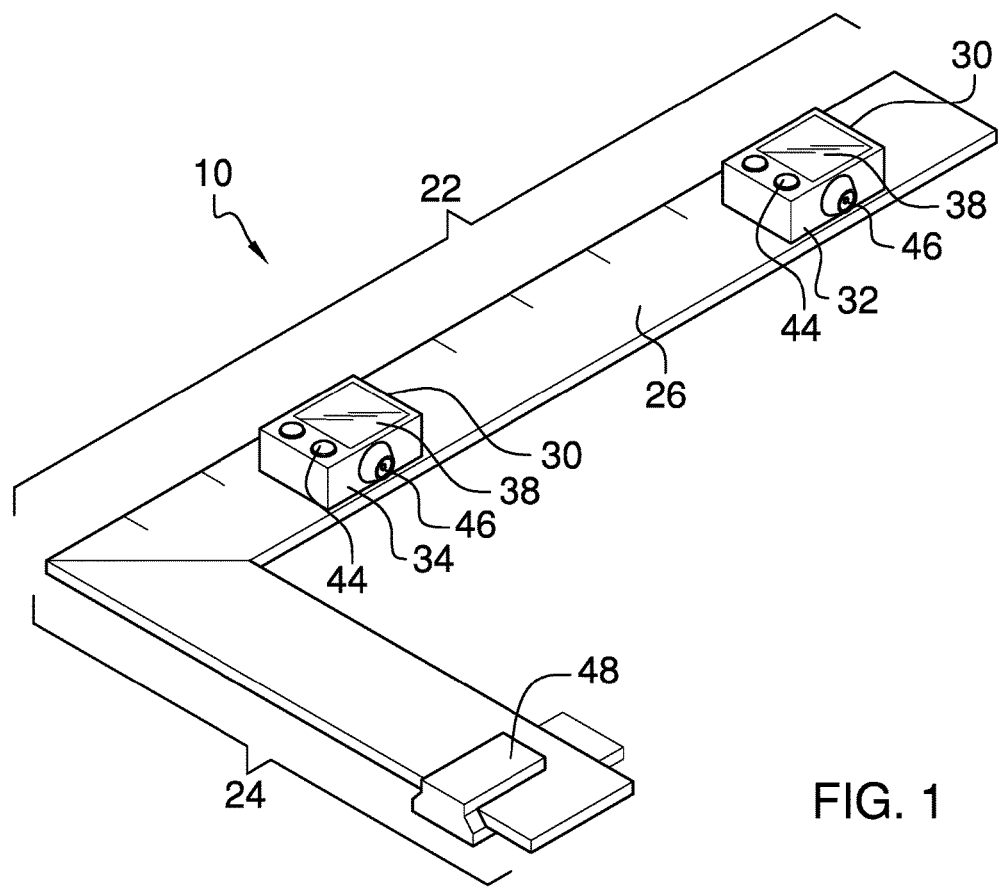
FIG. 1 is an isometric view.
Figure 2:
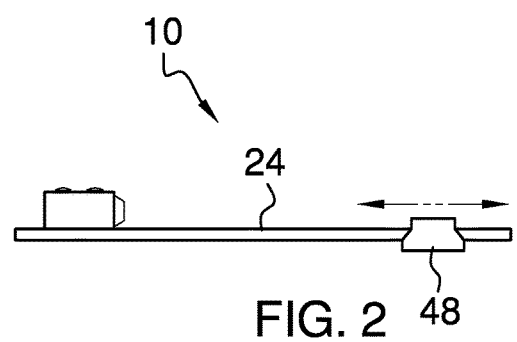
FIG. 2 is a side elevation view.
Figure 3:
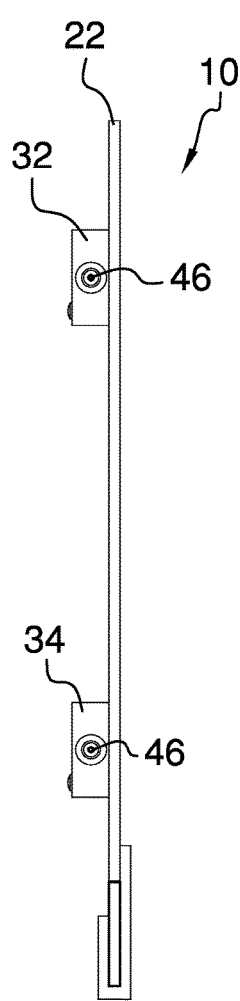
FIG. 3 is a front elevation view.
Figure 4:
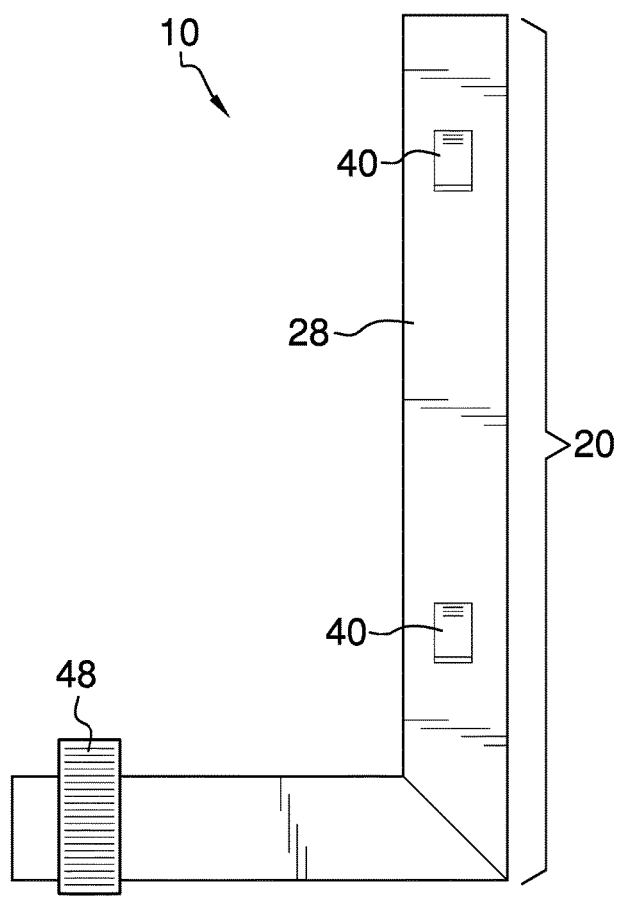
FIG. 4 is a bottom plan view.
Figure 5:
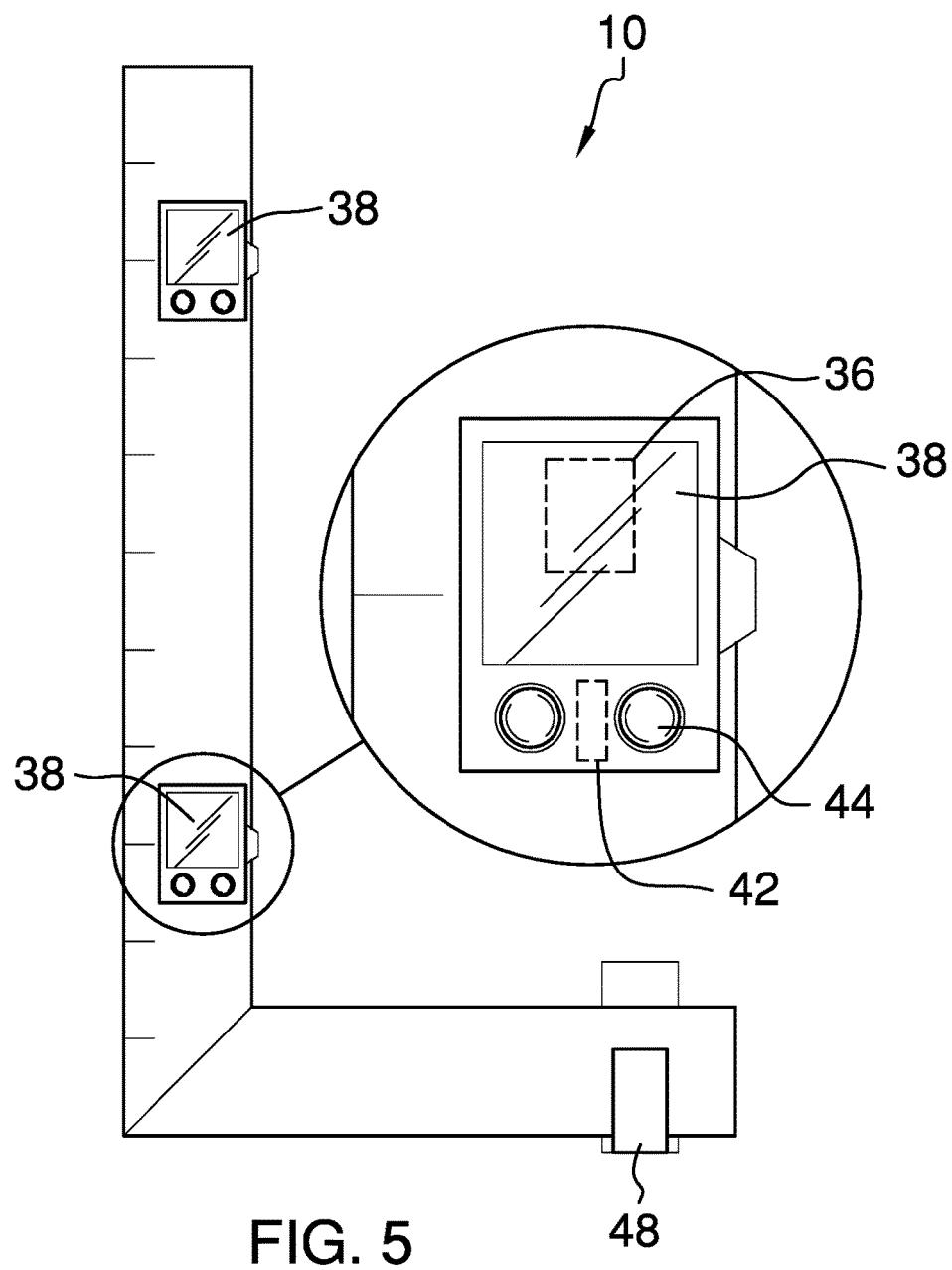
FIG. 5 is a top plan view.
Figure 6:
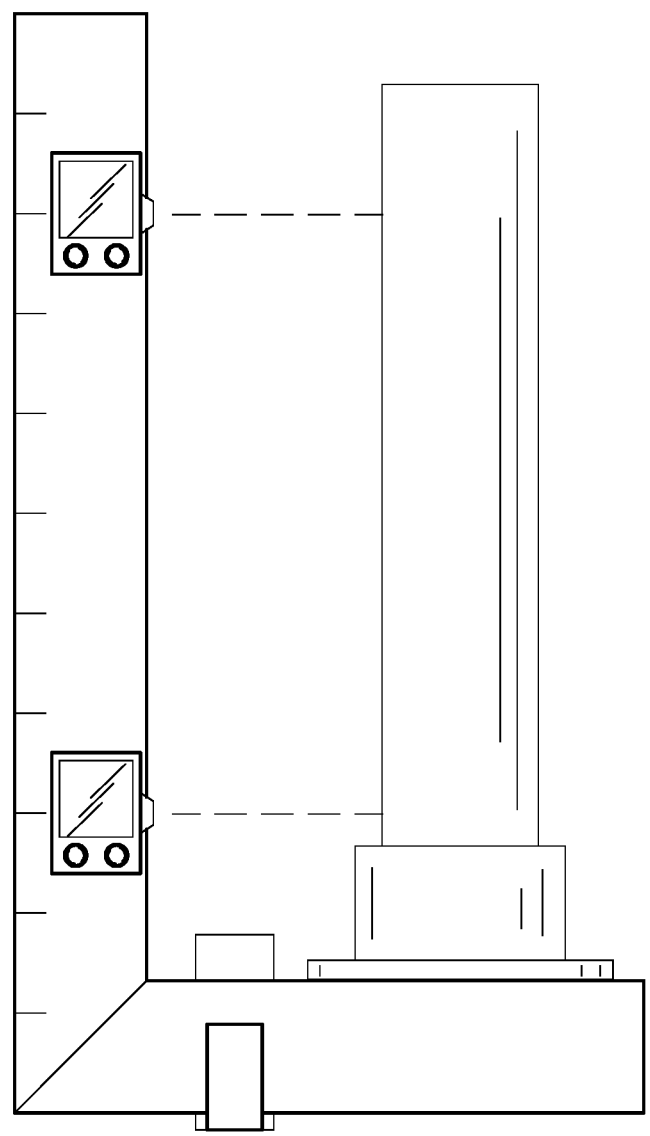
FIG. 6 is an in use view.

With reference now to the drawings, and in particular FIGS. 1 through 6 thereof, an example of the instant laser measuring device for a pipe fitting employing the principles and concepts of the present laser measuring device for a pipe fitting and generally designated by the reference number 10 will be described.

Referring to FIGS. 1 through 6 the present laser measuring device for a pipe fitting 10 is illustrated. The laser measuring device for a pipe fitting 10 includes an L-shaped framing square 20 having a first arm 22 and a second arm 24 attached to the first arm 22. Each of the first arm 22 and the second arm 24 has a top surface 26 and a bottom surface 28, and the first arm 22 is perpendicularly disposed to the second arm 24.

The laser measuring device for a pipe fitting 10 further includes a pair of laser housing units 30, optionally rectangular, including an upper laser housing unit 32 and a lower laser housing unit 34. Each of the upper laser housing unit 32 and the lower laser housing unit 34 is disposed on the top surface 26 of the first arm 22 of the L-shaped framing square 20. Each of the upper laser housing unit 32 and the lower laser housing unit 34 has a central processing unit 36, a display screen 38, a battery compartment 40, a battery 42 disposed within the battery compartment 40, an activation control 44 disposed proximal the display screen 38, and a laser 46 directed outward toward the second arm 24 of the L-shaped framing square 20. Each of the central processing unit 36, the laser 46, the battery 42, the display screen 38, and the activation control 44 of the upper laser housing unit 32 are in operational communication with each other, and each of the central processing unit 36, the laser 46, the battery 42, the display screen 38, and the activation control 44 of the lower laser housing unit 34 are in operational communication with each other. Additionally, the central processing unit 36 of the upper laser housing unit 32 and the central processing unit 36 of the lower laser housing unit 34 are in operational communication with each other. A lever 48 is slidably disposed on the second arm 24 of the L-shaped framing square 20.

What is claimed is:

1. A laser measuring device for a pipe fitting comprising:
   an L-shaped framing square having a first arm and a second arm attached to the first arm, each of the first arm and the second arm having a top surface and a bottom surface, wherein the first arm is perpendicularly disposed to the second arm;
   a pair of laser housing units comprising an upper laser housing unit and a lower laser housing unit, each of the upper laser housing unit and the lower laser housing unit disposed on the top surface of the first arm of the L-shaped framing square, each of the upper laser housing unit and the lower laser housing unit having a central processing unit, a display screen, a battery compartment, a battery disposed within the battery compartment, an activation control disposed proximal the display screen, and a laser directed outward toward the second arm of the L-shaped framing square; and
   a lever slidably disposed on the second arm of the L-shaped framing square;
   wherein each of the central processing unit, the laser, the battery, the display screen, and the activation control of the upper laser housing unit are in operational communication with each other;
   wherein each of the central processing unit, the laser, the battery, the display screen, and the activation control of the lower laser housing unit are in operational communication with each other;
   wherein the central processing unit of the upper laser housing unit and the central processing unit of the lower laser housing unit are in operational communication with each other;
   wherein the activation control of each of the upper laser housing unit and the lower laser housing unit is configured to activate the laser of each of the upper laser housing unit and the lower laser housing unit, respectively;
   wherein the central processing unit of each of the upper laser housing unit and the lower laser housing unit is configured to calculate a distance of the laser of each of the upper laser housing unit and the lower laser housing unit, respectively, from a pipe when the L-shaped framing square is disposed immediately adjacent to a pipe fitting;
   wherein the lever is configured to adjust a slope of the pipe fitting between the upper laser housing unit and the lower laser housing unit in order to ensure that the pipe fitting is square to the pipe during attachment of the pipe fitting to the pipe.

2. The laser measuring device for a pipe fitting of claim 1 wherein each of the pair of laser housing units is rectangular.

* * * * *